US008878718B2

(12) United States Patent
Ikuta et al.

(10) Patent No.: US 8,878,718 B2
(45) Date of Patent: Nov. 4, 2014

(54) INTRUDING OBJECT DISCRIMINATION APPARATUS FOR DISCRIMINATING INTRUDING OBJECT BASED ON MULTIPLE-DIMENSIONAL FEATURE

(75) Inventors: Koichi Ikuta, Tokyo (JP); Naoki Aizawa, Tokyo (JP); Kenji Inomata, Tokyo (JP); Hiroshi Kage, Tokyo (JP); Kazuhiko Sumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 301 days.

(21) Appl. No.: 13/576,463

(22) PCT Filed: Nov. 10, 2010

(86) PCT No.: PCT/JP2010/069971

§ 371 (c)(1),
(2), (4) Date: Aug. 1, 2012

(87) PCT Pub. No.: WO2011/102029

PCT Pub. Date: Aug. 25, 2011

(65) Prior Publication Data

US 2012/0306682 A1 Dec. 6, 2012

(30) Foreign Application Priority Data

Feb. 18, 2010 (JP) ................................ 2010-033380

(51) Int. Cl.
*G01S 13/00* (2006.01)
*G01S 13/52* (2006.01)
*G08B 13/24* (2006.01)
*G08B 29/18* (2006.01)

(52) U.S. Cl.
CPC .......... *G08B 13/2497* (2013.01); *G08B 29/185* (2013.01)
USPC ................ 342/27; 342/28; 342/160; 342/175

(58) Field of Classification Search
CPC ........... G01S 7/292; G01S 7/41–7/415; G01S 13/00; G01S 13/04; G01S 13/56; G08B 13/22–13/26; G01V 3/00; G01V 3/08; G01V 3/12
USPC .......................... 342/27, 28, 70–72, 160, 175
See application file for complete search history.

(56) References Cited

U.S. PATENT DOCUMENTS 4,328,487 A * 5/1982 Cheal ............................ 340/554
4,419,659 A * 12/1983 Harman et al. ............... 340/552
(Continued)

FOREIGN PATENT DOCUMENTS

JP 5 2690 1/1993
JP 3110112 11/2000
(Continued)

OTHER PUBLICATIONS

Parzen, E., "On Estimation of a Probability Density Function and Mode," Annals of Mathematical Statistics, vol. 33, No. 3, pp. 1065-1076, (1962).

(Continued)

*Primary Examiner* — Peter Bythrow
(74) *Attorney, Agent, or Firm* — Oblon, Spivak, McClelland, Maier & Neustadt, L.L.P.

(57) ABSTRACT

A normalization processing circuit normalizes a position of a complex demodulation signal on a complex plane from an A/D converter, and outputs a normalized complex demodulation signal after the normalization to a multiple-dimensional feature extractor. The multiple-dimensional feature extractor calculates a feature quantity that changes when a person intrudes, a feature quantity that changes in wind and rain, and a feature quantity that changes when a spatially isolated intense electric field exists. A discriminator discriminates that a person has intruded based on the feature quantities of three dimensions.

4 Claims, 6 Drawing Sheets

(56) References Cited

U.S. PATENT DOCUMENTS

| | | | | | |
|---|---|---|---|---|---|
| 4,562,428 | A * | 12/1985 | Harman et al. | ............... | 340/552 |
| 5,276,430 | A * | 1/1994 | Granovsky | ................. | 340/572.4 |
| 6,894,639 | B1 * | 5/2005 | Katz | ............................... | 342/90 |
| 6,937,185 | B1 * | 8/2005 | Collazo et al. | ................ | 342/159 |
| 7,456,739 | B2 * | 11/2008 | Inomata et al. | ............... | 340/552 |
| 7,492,306 | B2 * | 2/2009 | Humphrey et al. | ............. | 342/28 |
| 7,671,786 | B2 * | 3/2010 | Jain et al. | ........................ | 342/28 |
| 7,994,912 | B2 * | 8/2011 | Inomata et al. | ............... | 340/552 |
| 8,018,339 | B2 * | 9/2011 | Morita et al. | ................. | 340/552 |
| 8,624,734 | B2 * | 1/2014 | Inomata et al. | ............... | 340/541 |
| 2001/0052871 | A1 * | 12/2001 | Fukae et al. | .................... | 342/70 |
| 2004/0119633 | A1 * | 6/2004 | Oswald et al. | .................. | 342/70 |
| 2007/0024494 | A1 * | 2/2007 | Dizaji et al. | .................... | 342/90 |
| 2007/0222663 | A1 * | 9/2007 | Humphrey et al. | ............. | 342/28 |
| 2008/0266088 | A1 * | 10/2008 | Oyamada | ...................... | 340/561 |
| 2009/0278726 | A1 * | 11/2009 | Jain et al. | ........................ | 342/28 |
| 2010/0156636 | A1 * | 6/2010 | Inomata et al. | ............... | 340/541 |
| 2012/0306682 | A1 * | 12/2012 | Ikuta et al. | ...................... | 342/27 |

FOREIGN PATENT DOCUMENTS

| | | |
|---|---|---|
| JP | 2004 138402 | 5/2004 |
| JP | 2004 286567 | 10/2004 |
| JP | 2008 224324 | 9/2008 |
| JP | 2009 271071 | 11/2009 |
| JP | 2010 145318 | 7/2010 |
| JP | 2010 243231 | 10/2010 |

OTHER PUBLICATIONS

Amari, S., et al., “Statistics of Pattern Recognition and Learning,” Iwanami Shoten, pp. 41-43, (Apr. 1, 2003) (with English translation).

International Search Report Issued Jan. 18, 2011 in PCT/JP10/69971 Filed Nov. 10, 2010.

International Preliminary Report on Patentability and Written Opinion issued Sep. 27, 2012 in PCT/JP2010/069971 filed Nov. 10, 2010.

* cited by examiner

INTRUDING OBJECT DISCRIMINATION APPARATUS FOR DISCRIMINATING INTRUDING OBJECT BASED ON MULTIPLE-DIMENSIONAL FEATURE

TECHNICAL FIELD

The present invention relates to an intruding object discrimination apparatus for discriminating that an intruding object intruded into a warning area, by using radio waves.

BACKGROUND ART

In recent years, the security consciousness has been raised due to worsening security. In particular, physical security has been introduced into various facilities of not only large-scale facilities such as airports or power plants but also general enterprises, commercial facilities or public institutions. Although entering-leaving management at the gate of the facility has been a mainstream regarding the conventional physical security, surveillance intended for whole site of the facility becomes a mainstream lately. As conventional systems for detecting an intruder who intrudes into a predetermined surveillance region to be guarded, the intrusion detection system described in Patent Document 1 and the object detection apparatus described in Patent Document 2 have been known.

The intrusion detection system described in the Patent Document 1 is characterized by including a plurality of antennas installed in a detection region, a transmitter that transmits a signal from one of the plurality of antennas, a receiver that detects signals received by the other antennas, a calculator that detects amounts of changes in the signals detected by the receiver, and a judging device that judges whether or not an intrusion into the detection region has occurred based on the amounts of changes. In this case, the judging device judges that an intrusion into the detection region has occurred when at least one of the change in the amplitude of the signal and the change in the phase of the signal that are detected by the calculator is equal to or larger than a predetermined value.

In addition, the object detection apparatus described in the Patent Document 2 is characterized by including a transmitting cable, a receiving cable, a transmitter part connected to the transmitting cable to transmit a high-frequency current to the transmitting cable, and a receiver part connected to the receiving cable. The object detection apparatus receives electromagnetic waves transmitted from the transmitting cable by the receiving cable, and detects the presence or absence of an object based on a change in the intensity of the electromagnetic waves received by the receiving cable. In this case, the transmitter part includes means for changing standing waves generated in the transmitting cable. Concretely speaking, the object detection apparatus described in the Patent Document 2 judges that an intruder has passed over the receiving cable laid underground when it is detected by the receiver part that the amount of decrease in the received current intensity has exceeded a predetermined threshold value.

CITATION LIST

Patent Document

Patent Document 1: Japanese patent laid-open publication No. JP 5-2690 A.

Patent Document 2: Japanese patent No. 3110112.

Non-Patent Document

Non-Patent Document 1: Emanuel Parzen, "On Estimation of a Probability Density Function and Mode", Annals of Mathematical Statistics, Vol. 33, No. 3, pp. 1065-1076, 1962.

Non-Patent Document 2: Shunichi Amari et al., "Statistics of Pattern Recognition and Learning", pp. 41-43, Iwanami Shoten, published on Apr. 1, 2003.

SUMMARY OF INVENTION

Technical Problem

However, the intrusion detection system of the Patent Document 1 and the object detection apparatus of the Patent Document 2 sometimes erroneously activate an alarm informing the intruder's intrusion also when radio wave fluctuates are caused by natural phenomena such as wind and rain. For example, in the Patent Document 1, there has been such a problem that an alarm is erroneously activated when the change in the signal detected by the receiver in wind and rain is larger than a preset predetermined threshold value. In addition, also in the Patent Document 2, there has been such a problem that an alarm is erroneously activated when an amount of decrease in a received current intensity in wind and rain exceeds a predetermined threshold value.

It is an object of the present invention is to provide an intruding object discrimination apparatus capable of solving the above-described problems and capable of discriminating that an intruding object has intruded even if environment changes due to natural phenomena such as wind and rain, with accuracy higher than that of the prior art.

Solution to Problem

An intruding object discrimination apparatus according to the present invention includes transmitting means and receiving means. The transmitting means generates a predetermined transmission signal and wirelessly transmits the transmission signal with a transmitting antenna apparatus. The receiving means wirelessly receives a transmitted transmission signal with a receiving antenna apparatus that is provided opposite to the transmitting antenna apparatus, and demodulates a signal that is wirelessly received into a complex demodulation signal by executing quadrature detection of the signal that is wirelessly received using the transmission signal. The intruding object discrimination apparatus is characterized by including normalizing means, multiple-dimensional feature extraction means, and discriminating means. The normalizing that generates a normalized complex demodulation signal by normalizing a position of an inputted complex demodulation signal on a complex plane with a complex demodulation signal in a stationary state in which no intruding object intrudes between the transmitting antenna apparatus and the receiving antenna apparatus. The multiple-dimensional feature extraction means that calculates a multiple-dimensional feature quantity of the normalized complex demodulation signal. The discriminating means that discriminates whether or not an intruding object intruded between the transmitting antenna apparatus and the receiving antenna apparatus by using a predetermined discrimination plane based on a calculated multiple-dimensional feature quantity, and outputs a discrimination signal representing a discrimination result, the discrimination plane being a boundary formed of axes of the multiple-dimensional feature quantity for discriminating whether or not the intruding object intruded between the transmitting antenna apparatus and the receiving antenna apparatus.

Advantageous Effects of Invention

According to the intruding object discrimination apparatus of the present invention, there are provided the normalizing means that generates the normalized complex demodulation signal by normalizing the position of the inputted complex demodulation signal on the complex plane with the complex demodulation signal in the stationary state in which no intruding object intrudes between the transmitting antenna apparatus and the receiving antenna apparatus, and the multiple-dimensional feature extraction means that calculates the multiple-dimensional feature quantity of the normalized complex demodulation signal. Therefore, it is possible to reduce the frequency of erroneous alarm and to discriminate accurately that an intruding object has intruded as compared with the prior art intruding object discrimination apparatus that uses a threshold process.

DESCRIPTION OF EMBODIMENTS

Embodiment

Figure 1:
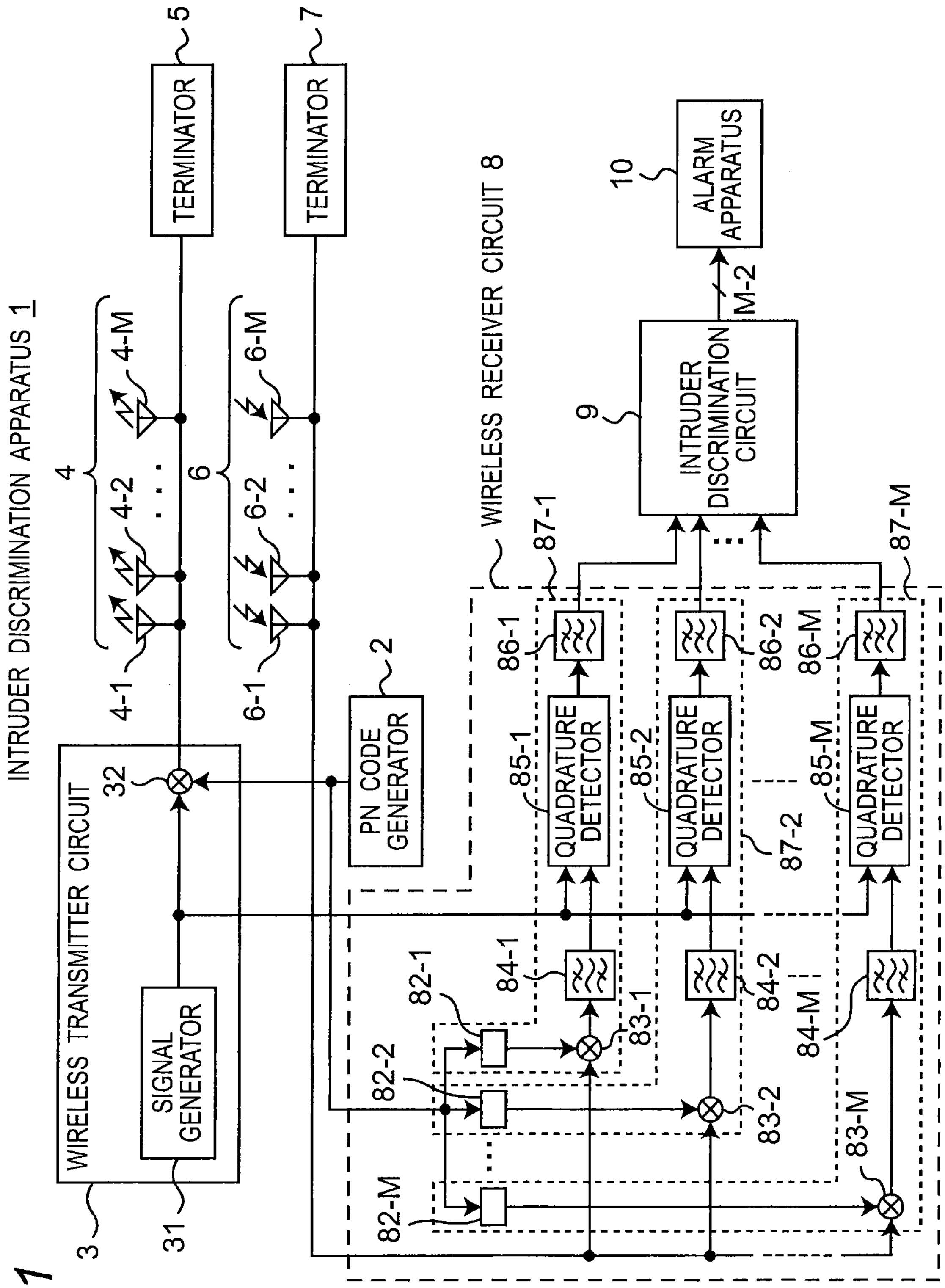
FIG. 1 is a block diagram showing a configuration of an intruding object discrimination apparatus 1 according to an embodiment of the present invention.
Figure 2:
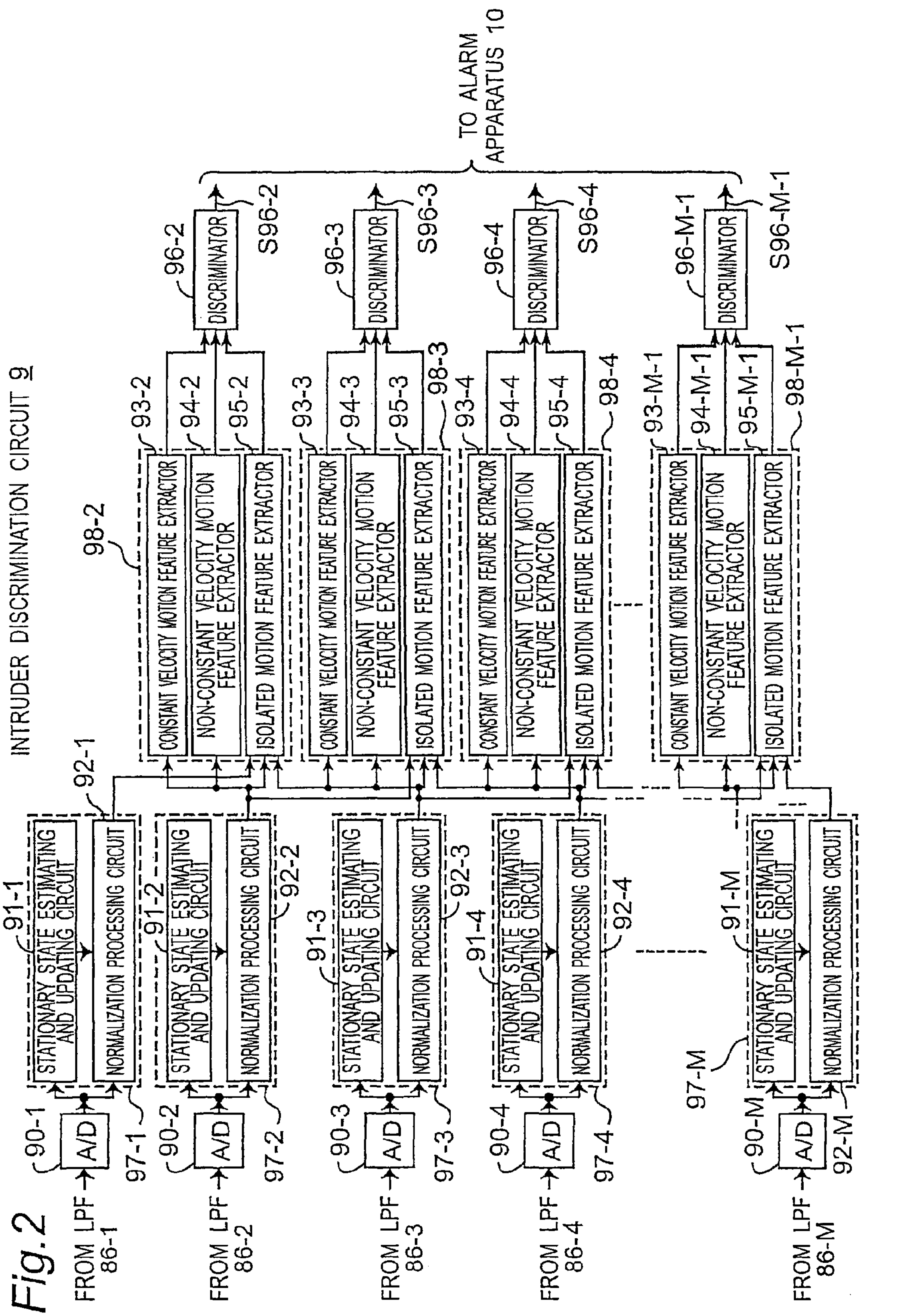
FIG. 2 is a block diagram showing a configuration of an intruding object discrimination circuit 9 of FIG. 1.
Figure 3:
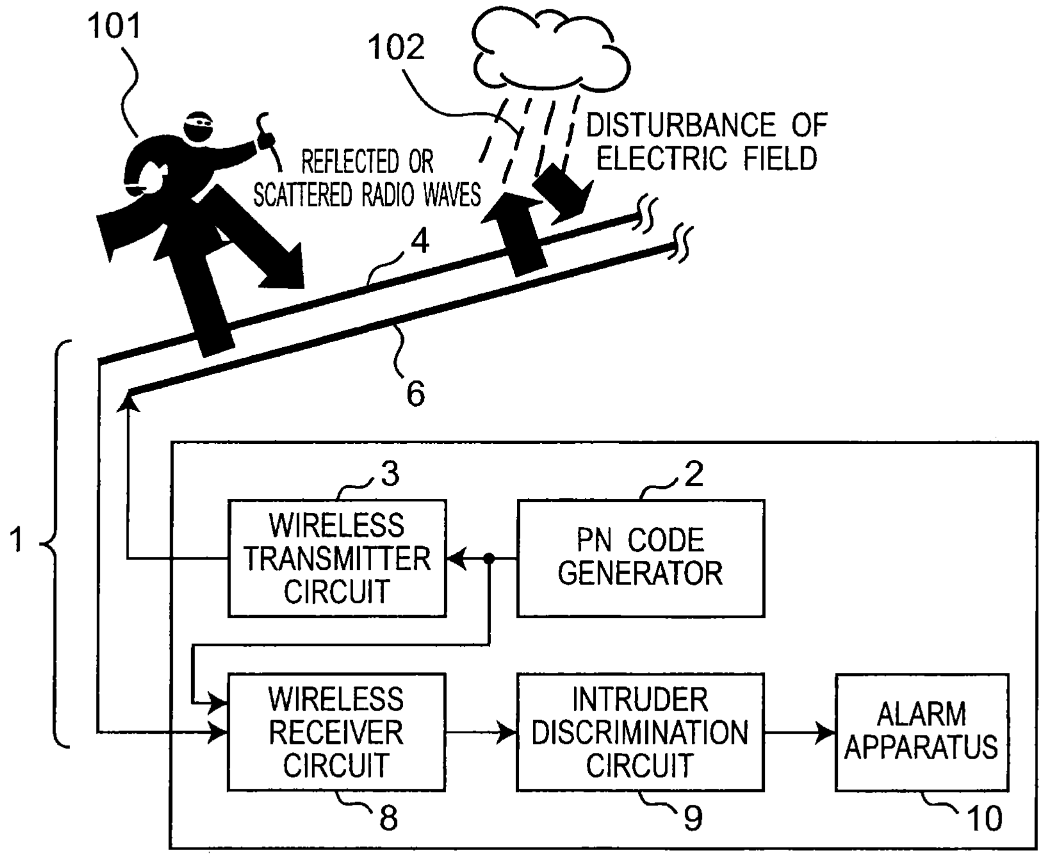
FIG. 3 is a block diagram showing the intruding object discrimination apparatus 1 of FIG. 1, a person 101, and rain 102.

An embodiment according to the present invention will be described below with reference to the drawings. FIG. 1 is a block diagram showing a configuration of an intruding object discrimination apparatus 1 according to the embodiment of the present invention, and FIG. 2 is a block diagram showing a configuration of an intruding object discrimination circuit 9 of FIG. 1. In addition, FIG. 3 is a block diagram showing the intruding object discrimination apparatus 1 of FIG. 1, a person 101, and rain 102. Referring to FIG. 1, the intruding object discrimination apparatus 1 is configured to include a PN (Pseudo Noise) code generator 2, a wireless transmitter circuit 3, a transmitting array antenna 4, a receiving array antenna 6, terminators 5 and 7, a wireless receiver circuit 8, the intruding object discrimination circuit 9, and an alarm apparatus 10. Further, the wireless transmitter circuit 3 is configured to include a signal generator 31 and a multiplier 32, and the wireless receiver circuit 8 is configured to include a plurality of M demodulator circuits 87-1 to 87-M, where M is equal to or larger than three. In this case, each demodulator circuit 87-*m* (m=1, 2, . . . , M) is configured to include a delay device 82-*m*, a multiplier 83-*m*, a bandpass filter 84-*m*, a quadrature detector 85-*m*, and a low-pass filter (LPF) 86-*m*.

As described later in detail, the intruding object discrimination apparatus 1 of the present embodiment is characterized by including:

(a) the wireless transmitter circuit 3, which generates a predetermined transmission signal, and transmits the transmission signal with the transmitting array antenna 4 including M transmitting antennas 4-1 to 4-M after spectrum-spreading the transmission signal with a PN code;

(b) the wireless receiver circuit 8, which receives transmitted transmission signals with the receiving array antenna 6 including M receiving antennas 6-1 to 6-M, generates a plurality of delayed PN codes by delaying the PN code by a plurality of delay times different from each other, respectively, generates a plurality of de-spread received signals by de-spreading signals that are wirelessly received with the plurality of delayed PN codes, respectively, and demodulates respective de-spread received signals into a plurality of complex demodulation signals by executing quadrature detection of the de-spread received signals using the transmission signal;

(c) normalizers 97-1 to 97-M, to which the plurality of complex demodulation signals from the wireless receiver circuit 8 are inputted, respectively, where each of the normalizers 97-1 to 97-M generates a normalized complex demodulation signal by normalizing a position of an inputted complex demodulation signal on the complex plane with a complex demodulation signal in a stationary state, in which neither wind nor rain occurs and no person 101 (intruding object) intrudes, as a reference signal;

(d) multiple-dimensional feature extractors 98-2 to 98-M−1, to each of which three normalized complex demodulation signals from respective three normalizers selected from among the normalizers 97-1 to 97-M, where each of the multiple-dimensional feature extractors 98-2 to 98-M−1 extracts a three-dimensional feature quantity based on inputted three normalized complex demodulation signals; and (e) discriminators 96-2 to 96-M−1, to which the multiple-dimensional feature quantities from the multiple-dimensional feature extractors 98-2 to 98-M−1 are inputted, respectively, where each of the discriminators 96-2 to 96-M−1 discriminates whether or not the person 101 has intruded based on the extracted feature quantity by using a predetermined discrimination plane Pm, and outputs discrimination signals S96-2 to S96-M−1 that represent discrimination results.

Further, each multiple-dimensional feature extractor 98-*n* (n=2, 3, . . . , M−1) is characterized by including:

(a) a constant velocity motion feature extractor 93-*n*, which calculates a feature quantity f1-*n* that changes when a person 101 intrudes between the transmitting antenna 4-*n* and the receiving antenna 6-*n*, based on the normalized complex demodulation signal inputted from the normalizer 97-*n;*

(b) a non-constant velocity motion feature extractor 94-*n*, which calculates a feature quantity f2-*n* that changes when a space between the transmitting antenna 4-*n* and the receiving antenna 6-*n* is exposed to wind and rain, based on the normalized complex demodulation signal inputted from the normalizer 97-*n*; and (c) an isolated motion feature extractor 95-*n*, which calculates a feature quantity f3-*n* that changes when an intense electric field region that is spatially isolated from other spaces exists between the transmitting antenna 4-*n* and the receiving antenna 6-*n* among the spaces between the transmitting array antenna 4 and the receiving array antenna 6, based on three normalized complex demodulation signals inputted from the normalizers 97-*n*−1, n, and n+1.

Referring to FIG. 1, the transmitting array antenna 4 is a leaky coaxial cable (LCX) including M slits that are provided at predetermined intervals and function as the M transmitting antennas 4-1 to 4-M. In addition, the receiving array antenna 6 is a leaky coaxial cable including M slits that are provided at predetermined intervals and function as the M receiving antennas 6-1 to 6-M. Further, the terminator 5 absorbs radio waves that remain without being radiated by the transmitting array antenna 4, and the terminator 7 absorbs radio waves that travel to a side opposite to the wireless receiver circuit 8 among the radio waves received by the receiving array antenna 6. The leaky coaxial cables of the transmitting array antenna 4 and the receiving array antenna 6 are laid substantially parallel to each other with a predetermined interval so that the transmitting antennas 4-*m* oppose to the receiving antennas 6-*m*, respectively, surrounding a predetermined warning area. As described later in detail, an electric field is formed between the two leaky coaxial cables, and an intruding object (the person 101 of FIG. 3 in the present embodiment), that has intruded into the warning area crossing the two leaky coaxial cables, is discriminated based on fluctuations in the electric field. In the present embodiment, it is noted that "when the person 101 intrudes" means the time when the person 101 intrudes between the transmitting array antenna 4 and the receiving array antenna 6, and "in wind and rain" means the time when the space between the transmitting array antenna 4 and the receiving array antenna 6 is exposed to wind and rain.

In this case, the intervals between the transmitting antennas 4-1 to 4-M and the intervals between the receiving antennas 6-1 to 6-M are set equal to or larger than half, or preferably several or more times the wavelength of the radio waves radiated from the transmitting array antenna 4. Further, the interval between the leaky coaxial cables of the transmitting array antenna 4 and the receiving array antenna 6 is set so that a wireless signal can be transmitted from the transmitting antenna 4-*m* to the receiving antenna 6-*m* opposed to the transmitting antenna 4-*m*.

Referring to FIG. 1, the PN code generator 2 generates a predetermined PN code, and outputs the PN code to the multiplier 32 and the delay devices 82-1 to 82-M. In addition, the signal generator 31 generates a transmission signal including predetermined frequency components, and outputs the transmission signal to the multiplier 32 and the quadrature detectors 85-1 to 85-M. The multiplier 32 spectrum-spreads the transmission signal by multiplying the transmission signal from the signal generator 31 by the PN code, and radiates a spectrum-spread transmission signal with the transmitting array antenna 4 as radio waves. Namely, the multiplier 32 modulates the transmission signal from the signal generator 31 according to the PN code. The radio waves radiated by the transmitting array antenna 4 are received as received signals by the receiving array antenna 6, and are outputted to the multipliers 83-1 to 83-M.

Referring to FIG. 1, each of the delay devices 82-*m* (m=1, 2, . . . , M) delays an inputted PN code by a predetermined propagation delay time from a timing when the inputted PN code is outputted from the PN code generator 2 to a timing when it is outputted to the multiplier 83-*m* via the multiplier 32, the transmitting antenna 4-*m* and the receiving antenna 6-*m*. The PN code after being delayed (referred to as a delayed PN code hereinafter) is outputted to the multiplier 83-*m*. Further, each of the multipliers 83-*m* de-spreads the received signal by multiplying the inputted received signal by the inputted delayed PN code to generate a de-spread received signal, and outputs a resultant signal to the quadrature detector 85-*m* via the bandpass filter 84-*m*. Further, each of the quadrature detectors 85-*m* quadrature-detects the de-spread received signal from the bandpass filter 84-*m* into a complex demodulation signal including an in-phase component and a quadrature component with the transmission signal from the signal generator 31, and outputs a resultant signal to the intruding object discrimination circuit 9 via the low-pass filter 86-*m*. In this case, the passband of each of the bandpass filters 84-*m* is set to pass therethrough the frequency components of the transmission signal from the signal generator 31, and the passband of each of the low-pass filters 86-*m* is set to remove harmonic components and noises included in the inputted complex demodulation signal.

In this case, each of the receiving antennas 6-*m* (m=1, 2, . . . , M) receives a received signal, where the radio waves radiated from the transmitting antenna 4-*m* opposed to the receiving antennas 6-*m* and the radio waves from the transmitting antennas near the transmitting antenna 4-*m* are superimposed on the others to generate the received signal. Further, the received signal is multiplied by the delayed PN code signal from the delay device 82-*m* by the multiplier 83-*m*. Therefore, the complex demodulation signal outputted via the quadrature detector 85-*m* and the low-pass filter 86-*m* is substantially equal to a complex demodulation signal obtained by demodulating the received signal when only the received signal from the transmitting antenna 4-*m* is received by the receiving antenna 6-*m*.

Figure 4:
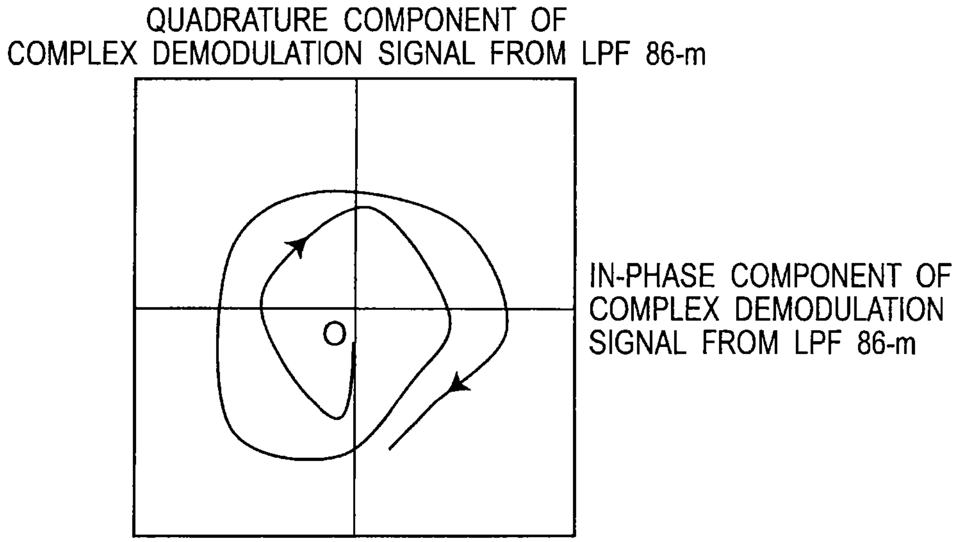
FIG. 4 is a graph showing a complex demodulation signal outputted from a low-pass filter 86-*m* on a complex plane when the person 101 intrudes between a transmitting antenna 4-*m* (m=1, 2, . . . , M) and a receiving antenna 6-*m* of FIG. 1.
Figure 5:
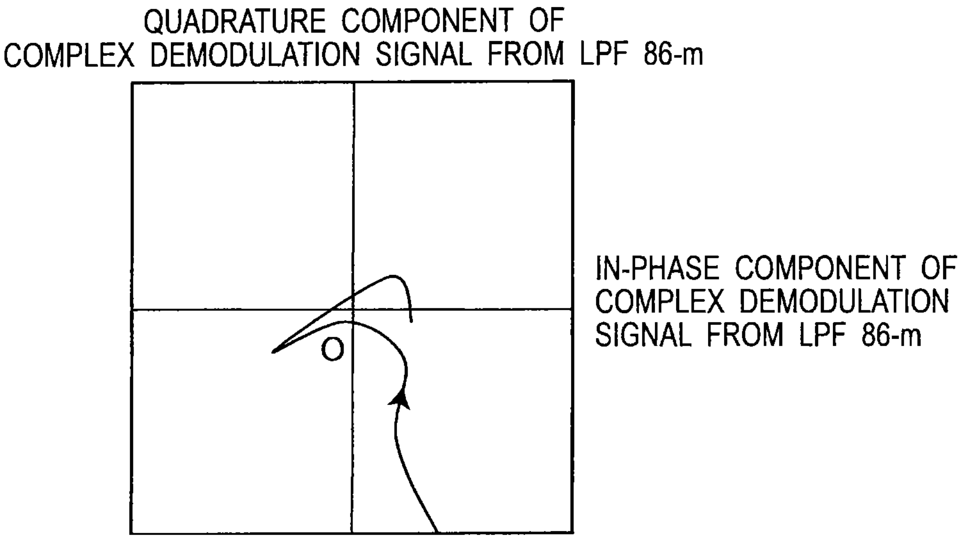
FIG. 5 is a graph showing a complex demodulation signal outputted from the low-pass filter 86-*m* on the complex plane when a space between the transmitting antenna 4-*m* and the receiving antenna 6-*m* of FIG. 1 is exposed to wind and rain.

FIG. 4 is a graph showing the complex demodulation signal outputted from the low-pass filter 86-*m* on a complex plane when the person 101 intrudes between the transmitting antenna 4-*m* and the receiving antenna 6-*m* of FIG. 1. In addition, FIG. 5 is a graph showing a complex demodulation signal outputted from the low-pass filter 86-*m* on the complex plane when the space between the transmitting antenna 4-*m* and the receiving antenna 6-*m* of FIG. 1 is exposed to wind and rain. Generally speaking, when the person 101 does not intrude between the transmitting antenna 4-*m* and the receiving antenna 6-*m*, and the space between the transmitting antenna 4-*m* and the receiving antenna 6-*m* is not exposed to wind and rain (referred to as a stationary state hereinafter), the complex demodulation signal concentrates in the neighborhood of the origin of the complex plane. In addition, when the person 101 intrudes between the transmitting antenna 4-*m* and the receiving antenna 6-*m*, the radio waves from the transmitting array antenna 4 are reflected and scattered by the person 101 and thereafter received by the receiving array antenna 6 as shown in FIG. 3. In this case, as shown in FIG. 4, the complex demodulation signal outputted from the low-pass filter 86-*m* corresponding to the transmitting antenna 4-*m* and the receiving antenna 6-*m* has such a feature (also referred to as a regular motion hereinafter) that the complex demodulation signal moves in a circle about the origin on the complex plane at a constant angular velocity. Further, as shown in FIG. 3, the electric field between the transmitting array antenna 4 and the receiving array antenna 6 is disturbed by rain 102 in wind and rain. In this case, as shown in FIG. 5, the complex demodulation signal outputted from the low-pass filter 86-*m* has such a feature (also referred to as performing an irregular motion hereinafter) that fluctuations in amplitude and phase of the complex demodulation signal are larger than those of the complex demodulation signal in the stationary state and those of the complex demodulation signal when the person 101 intrudes as shown in FIG. 4.

Referring to FIG. 2, the intruding object discrimination circuit 9 is configured to include analogue-to-digital converters (referred to as A/D converters hereinafter) 90-1 to 90-M, normalizers 97-1 to 97-M, multiple-dimensional feature extractors 98-2 to 98-M−1, and discriminators 96-2 to 96-M−1. In addition, each of the normalizers 97-*m* is configured to include a stationary state estimating and updating circuit 91-*m*, and a normalization processing circuit 92-*m*. Each of the multiple-dimensional feature extractors 98-*n* (n=2, 3, . . . , M−1) is configured to include a constant velocity motion feature extractor 93-*n*, a non-constant velocity motion feature extractor 94-*n*, and an isolated motion feature extractor 95-*n*. The complex demodulation signal outputted from each low-pass filter 86-*m* is converted into a digital complex demodulation signal dm(k) (k is an integer representing a sampling timing) at a predetermined sampling frequency by an A/D converter 90-*m*, and thereafter, outputted to the stationary state estimating and updating circuit 91-*m* and the normalization processing circuit 92-*m*. It is noted that the sampling frequency in each A/D converter 90-*m* is set to 16 Hz, for example.

Referring to FIG. 2, each of the stationary state estimating and updating circuits 91-*m* (m=1, 2, . . . , M) calculates a difference vector that represents a trajectory of the complex demodulation signal on the complex plane by calculating, every sampling timing k, a difference in the in-phase components of two complex demodulation signals dm(k) and dm(k−1) at consecutive two sampling timings k and k−1 and a difference in the quadrature components of the two complex demodulation signals dm(k) and dm(k−1). Then, each of the stationary state estimating and updating circuits 91-*m* judges that the current state is the stationary state when a magnitude of a calculated difference vector is smaller than a predetermined threshold value, calculates a centroid position pm(k) of the trajectory of the complex demodulation signal on the complex plane in the stationary state at the sampling timing k by using the following Equation, and outputs the centroid position pm(k) to the normalization processing circuit 92-*m*:

[Equation 1]

$$pm(k) = \frac{\sum_{j=k-L+1}^{k} dm(j)}{L}, \tag{1}$$

where L is the number of sampling used for estimating the centroid position pm(k) (m=1, 2, . . . , M). In addition, each of the stationary state estimating and updating circuits 91-*m* judges that the current state is the stationary state when the magnitude of the above-described calculated difference vector is equal to or larger than a predetermined threshold value, and sets the centroid position pm(k) of the trajectory of the complex demodulation signal on the complex plane in the stationary state to the centroid position pm(k−1) at the previous sampling timing k−1 without updating the centroid position. Each of the normalization processing circuits 92-*m* performs a normalizing process of the position on the complex plane of an inputted complex demodulation signal dm(k) every sampling timing k, by using the centroid position pm(k) of the trajectory of the complex demodulation signal on the complex plane in the stationary state as a reference position. A complex demodulation signal (referred to as a normalized complex demodulation signal hereinafter) dam(k) after the normalizing process at the sampling timing k outputted from each normalization processing circuit 92-*m* is represented by the following Equation:

[Equation 2]

$$dam(k)=dm(k)-pm(k) \tag{2}.$$

Referring to FIG. 2, at each sampling timing k, the normalized complex demodulation signals dan-1(k), dan(k) and dan+1(k) from three normalization processing circuits 92-*n*−1, 92-*n*, 92-*n*+1 are outputted to each multiple-dimensional feature extractor 98-*n* (n=2, 3, . . . , M−1).

Figure 6:
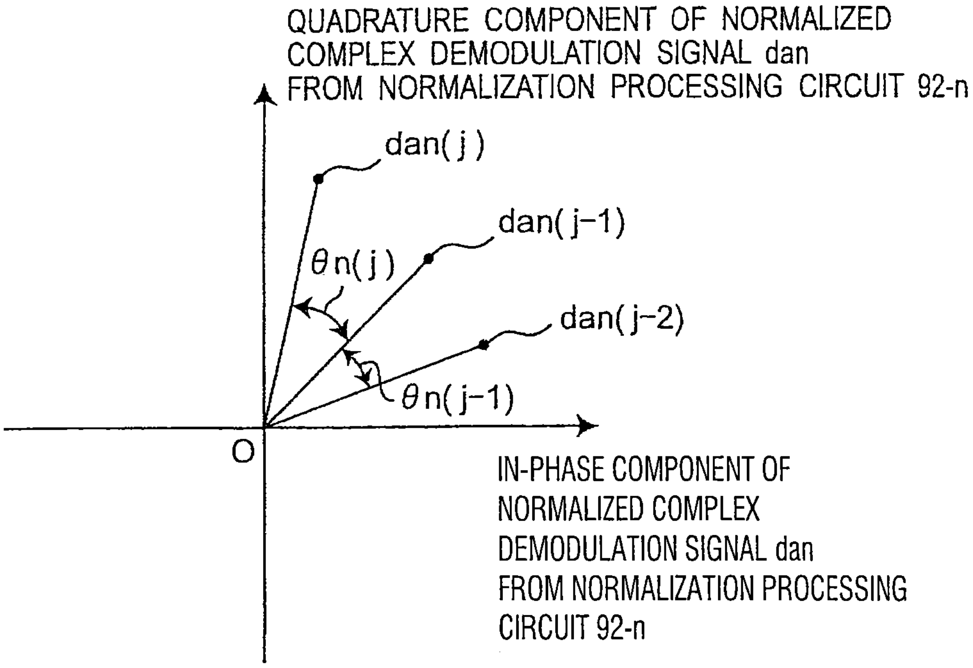
FIG. 6 is a graph showing a relation between an angular velocity θn(j) of an Equation (3), which represents a feature quantity f1-*n* (n=2, 3, . . . , M−1) calculated by the intruding object discrimination circuit 9 of FIG. 2, and a normalized complex demodulation signal dan(j)
Figure 7:
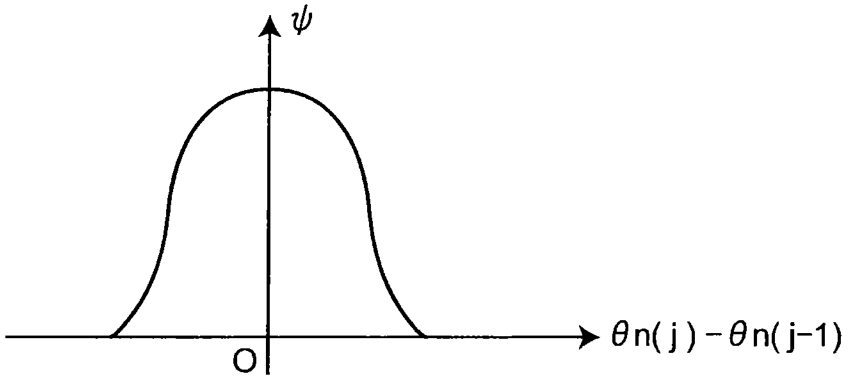
FIG. 7 is a graph showing a function Ψ(θn(j)−θn(j−1)) of the Equation (3)

Referring to FIG. 2, each of the constant velocity motion feature extractors 93-*n* (n=2, 3, . . . , M−1) calculates a feature quantity f1-*n* based on the normalized complex demodulation signal dan(k) from the normalization processing circuit 92-*n* by using the following Equation:

[Equation 3]

$$f1-n = \sum_{j=k-Q+1}^{k} \Psi(\theta_n(j) - \theta n(j-1)), \tag{3}$$

where j is an integer that represents the sampling timing. FIG. 6 is a graph showing a relation between the angular velocity θn(j) of the above Equation (3) and the normalized complex demodulation signal dan(j). As shown in FIG. 6, the angular velocity θn(j) is an angle between a normalized complex demodulation signal dan(j) at a sampling timing j and a normalized complex demodulation signal dan(j−1) at a sampling timing j−1. FIG. 7 is a graph showing a function Ψ(θn(j)−θn(j−1)) of the Equation (3). As shown in FIG. 7, the function Ψ is selected so as to have a larger value as the magnitude of the difference between the angular velocities Ψn(j)−θn(j−1) at the sampling timings j and j−1 is closer to zero. The function Ψ may be a bell-shaped function such as a Gaussian function. Further, in the Equation (3), Q is a total number of samples of the normalized complex demodulation signal dan(j) used for calculating the feature quantity f1-*n*, and is set to a value corresponding to time required for the person 101 to cross the transmitting array antenna 4 and the receiving array antenna 6. As described with reference to FIG. 4, there is the feature that the normalized complex demodulation signal dan(j) performs a "regular motion", in which the normalized complex demodulation signal dan(j) smoothly moves in a circle about the origin at a constant angular velocity, when the person 101 has intruded between the transmitting antenna 4-*n* and the receiving antenna 6-*n*. Therefore, the feature quantity f1-*n* changes to have a maximum value when the person 101 has intruded between the transmitting antenna 4-*n* and the receiving antenna 6-*n*. In addition, in wind and rain and in the stationary state, the feature quantity f1-*n* has a value smaller than when the person 101 has intruded between the transmitting antenna 4-*n* and the receiving antenna 6-*n*.

Referring to FIG. 2, each of the non-constant velocity motion feature extractors 94-*n* (n=2, 3, . . . , M−1) calculates a feature quantity f2-*n* based on the normalized complex demodulation signal dan(k) from the normalization processing circuit 92-*n* by using the following Equation:

[Equation 4]

$$f2-n=\sum_{j=k-Q+1}^{k}(dan(j)^2-dan(j-1)^2). \quad (3)$$

As described with reference to FIG. 5, there is the feature that the variation in the amplitude of the complex demodulation signal when the space between the transmitting antenna 4-*n* (n=2, 3, . . . , M−1) and the receiving antenna 6-*n* (n=2, 3, . . . , M−1) is exposed to wind and rain has a value larger than those of the complex demodulation signal in the stationary state and the complex demodulation signal when the person 101 has intruded between the transmitting antenna 4-2 and the receiving antenna 6-*n*. Therefore, the feature quantity f2-*n* changes to have a maximum value when the space between the transmitting antenna 4-*n* and the receiving antenna 6-*n* is exposed to wind and rain. In addition, the feature quantity f2-*n* has a value smaller than in wind and rain when the person 101 has intruded between the transmitting antenna 4-*n* and the receiving antenna 6-*n* and in the stationary state.

Referring to FIG. 2, each of the isolated motion feature extractors 95-*n* (n=2, 3, . . . , M−1) calculates a feature quantity f3-*n* at the sampling timing k based on the normalized complex demodulation signals dan-1(k), dan(k) and dan+1(k) from the normalization processing circuits 92-*n*−1, 92-*n* and 92-*n*+1, respectively, by using the following Equation:

[Equation 5]

$$f3-n=-dan-1(k)^2+2dan(k)^2-dan+1(k)^2 \quad (5).$$

When a difference between the intensity of the radio waves received by the receiving antenna 6-*n* (n=2, 3, . . . , M−1) and the intensity of the radio waves received by the receiving antennas 6-*n*−1 and 6-*n*+1 on both adjacent sides becomes large, the value of the feature quantity f3-*n* becomes large. Generally speaking, if the person 101 intrudes between the transmitting array antenna 4 and the receiving array antenna 6, then an intense electric field region that is spatially isolated from the other spaces appears in the space in the neighborhood of the person 101 among the spaces between the transmitting array antenna 4 and the receiving array antenna 6. Therefore, the amplitude of the normalized complex demodulation signal corresponding to one receiving antenna located nearest to the person 101 among the receiving antennas 6-1 to 6-M that constitute the receiving array antenna 6 becomes larger than the amplitude of the normalized complex demodulation signal corresponding to the other receiving antennas. Therefore, when the person 101 has intruded between the transmitting antenna 4-*n* and the receiving antenna 6-*n*, the feature quantity f3-*n* corresponding to the receiving antenna 6-*n* has a maximum value among all of the feature quantities f3-2 to f3-M−1. In addition, in wind and rain and in the stationary state, the feature quantity f3-*n* has a value smaller than when the person 101 has intruded between the transmitting antenna 4-*n* and the receiving antenna 6-*n*.

Referring to FIG. 2, each of the discriminators 96-*n* (n=2, 3, . . . , M−1) judges whether or not the person 101 has intruded between the transmitting antenna 4-*n* and the receiving antenna 6-*n* based on the feature quantities f1-*n*, f2-*n* and f3-*n* of three dimensions calculated by the multiple-dimensional feature extractor 98-*n* by using PKDE (Parzen Kernel Density Estimation) algorithm (See the Non-Patent Documents 1 and 2). In this case, the PKDE algorithm is a discrimination algorithm, based on a probability density, for estimating the probability density of each event to be discriminated from learning sample data, estimating a discrimination plane (also called a discrimination boundary) Pn that is probabilistically optimum, and discriminating which discrimination event's sample data the sample data to be discriminated is by using the discrimination plane Pn. Concretely speaking, in the present embodiment, before operating the intruding object discrimination apparatus 1, each discriminator 98-*n* acquires feature quantities f1-*n*, f2-*n* and f3-*n* when the person 101 has intruded between the transmitting antenna 4-*n* and the receiving antenna 6-*n*, and feature quantities f1-*n*, f2-*n* and f3-*n* when the space between the transmitting antenna 4-*n* and the receiving antenna 6-*n* is exposed to wind and rain. Further, by using the acquired feature quantities as learning sample data in the feature spaces, a discrimination plane Pn for discriminating the event that the person 101 has intruded between the transmitting antenna 4-*n* and the receiving antenna 6-*n*, and the event that the space between the transmitting antenna 4-*n* and the receiving antenna 6-*n* is exposed to wind and rain, is estimated in the three-dimensional feature space by the Parzen kernel density estimation method. Then, during the operation of the intruding object discrimination apparatus 1, each of the discriminators 96-*n* discriminates whether or not the person 101 has intruded between the transmitting antenna 4-*n* and the receiving antenna 6-*n*, based on the feature quantities f1-*n*, f2-*n* and f3-*n* calculated by the multiple-dimensional feature extractor 98-*n* by using the estimated discrimination plane Pn.

Figure 8:
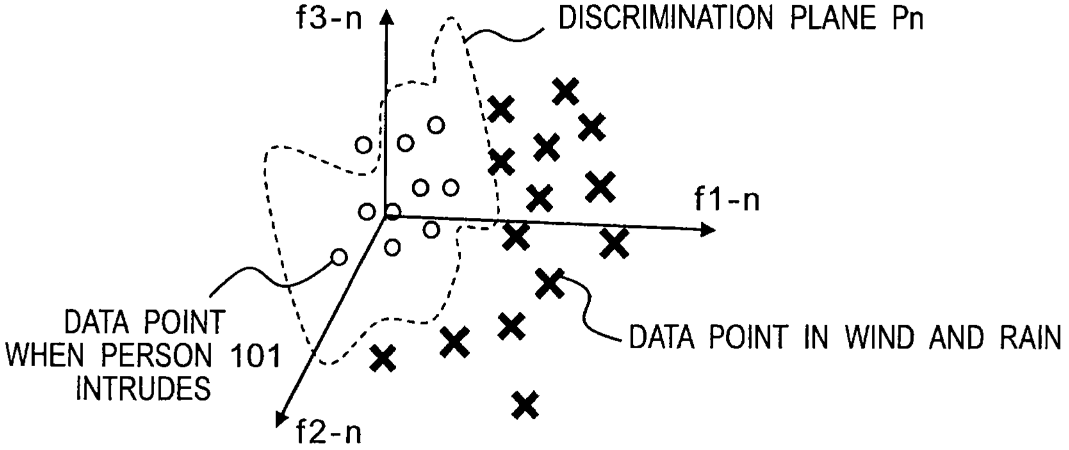
FIG. 8 is a graph showing a discrimination plane Pn in a three-dimensional feature space used in a discriminator 96-*n* of FIG. 2.

FIG. 8 is a graph showing the discrimination plane Pn in the three-dimensional feature space used in the discriminator 96-*n* of FIG. 2. As shown in FIG. 8, the discrimination plane Pn is a curved surface that is formed of the axes of the feature quantities f1-*n*, f2-*n* and f3-*n* of three dimensions, and corresponds to a boundary for discriminating the event that the person 101 has intruded between the transmitting antenna 4-*n* and the receiving antenna 6-*n*, and the event that the space between the transmitting antenna 4-*n* and the receiving antenna 6-*n* is exposed to wind and rain.

Referring to FIG. 2, each of the discriminators 96-*n* (n=2, 3, . . . , M−1) outputs a discrimination signal S96-*n*, that represents a discrimination result, to the alarm apparatus 10. Further, the alarm apparatus 10 has a loudspeaker and a display apparatus, and output a predetermined alarm sound from the loudspeaker and display a predetermined alarm display on the display apparatus in response to at least one discrimination signal S96-*n* that represents the intrusion of the person 101.

As described above, according to the present embodiment, the complex demodulation signal from each A/D converter 90-*m* (m=1, 2, . . . , M) is subjected to a normalizing process, and thereafter, the feature quantities f1-*n*, f2-*n* and f3-*n* (n=2, 3, . . . M−1) are calculated based on the complex demodulation signal dam after the normalizing process. Therefore, as compared with a case where the normalizing process is not performed, it is possible to improve the discrimination accuracy of the intrusion of the person 101 without any influence by the variation in the position of the complex demodulation signal dam on the complex plane due to environmental fluctuations. Further, the intrusion of the person 101 in the warning area is discriminated with the feature quantity f2-*n* that changes when the space between the transmitting antenna 4-*n* and the receiving antenna 6-*n* is exposed to wind and rain and the feature quantity f3-*n* that changes when an intense electric field region that is spatially isolated from the other spaces exists in the space between the transmitting antenna 4-*n* and the receiving antenna 6-*n* in addition to the feature quantity f1-*n* that changes when the person 101 has intruded between the transmitting antenna 4-*n* and the receiving antenna 6-*n*. Therefore, it is possible to reduce the frequency of erroneous alarm in wind and rain and to discriminate accurately that an intruding object has intruded as compared with the prior art intruding object discrimination apparatus that uses a threshold process.

Although the intruding object discrimination apparatus 1 discriminates that the person 101 has intruded into the warning area in the present embodiment, however, the present invention is not limited to this. It is acceptable to discriminate the event that a small animal intruding object of a dog, a cat and the like has intruded into the warning area.

In addition, since the moving speed of a vehicle is more constant than the moving speed of the person 101, and the volume of the vehicle is larger than the volume of the person 101, the value of the feature quantity f1-*n* becomes larger and the feature quantity f2-*n* becomes smaller when the vehicle passes in the neighborhood of the transmitting antenna 4-*n* (n=2, 3, . . . , M−1) and the receiving antenna 6-*n* than when the person 101 intrudes between the transmitting antenna 4-*n* and the receiving antenna. Therefore, by further estimating and using a discrimination plane for discriminating the passage of the vehicle in each discriminator 96-*n*, the discrimination accuracy of the person 101 can be further improved.

Further, although each multiple-dimensional feature extractor 98-*n* (n=2, 3, . . . , M−1) calculates the three-dimensional feature including the feature quantities f1-*n*, f2-*n* and f3-*n*, however, the present invention is not limited to this. Each multiple-dimensional feature extractor 98-*n* may calculate a multiple-dimensional feature quantity having a dimension equal to or larger than two. In this case, the multiple-dimensional feature quantity preferably include the feature quantity f1-*n* that changes when a person 101 has intruded between the transmitting antenna 4-*n* and the receiving antenna. When a two-dimensional feature quantity is calculated, the discrimination plane Pn used in each discriminator 96-*n* is a curved line that is formed of the axes of the two-dimensional feature quantity and corresponds to a boundary for discrimination between the event that the person 101 has intruded between the transmitting antenna 4-*n* and the receiving antenna 6-*n* and the event that the person 101 has not intruded between the transmitting antenna 4-*n* and the receiving antenna 6-*n*. When a three-dimensional feature quantity is calculated, the discrimination plane Pn used in each discriminator 96-*n* is a curved surface that is formed of the axes of the three-dimensional feature quantity and corresponds to a boundary for discrimination between the event that the person 101 has intruded between the transmitting antenna 4-*n* and the receiving antenna 6-*n* and at least one other event.

Still further, when the discrimination result included in the discrimination signal S96-*n* from each discriminator 96-*n* (n=2, 3, . . . , M−1) is an error, it is acceptable to perform additional learning for correcting the discrimination plane Pn based on the feature quantities f1-*n*, f2-*n* and fn-3 of three dimensions. By this operation, the discrimination accuracy can be improved in the operation of the intruding object discrimination apparatus 1.

In addition, a calculating method of the centroid position pm(k) of the trajectory of each complex demodulation signal dm(k) on the complex plane at the sampling timing k in the stationary state by each stationary state estimating and updating circuit 91-*m* (m=1, 2, . . . , M) is not limited to the method represented by the Equation (1). Each stationary state estimating and updating circuit 91-*m* may normalize the position of the complex demodulation signal dm(k) on the complex plane with the complex demodulation signal dm(k) in the stationary state in which no person 101 intrudes as a reference signal. For example, each stationary state estimating and updating circuit 91-*m* may estimate the centroid position pm(k) at the sampling timing k by using the following Equation without judging whether or not the current state is the stationary state:

[Equation 6]

$$pm(k)=(1-\epsilon)pm(k-1)+\epsilon dm(k-1) \quad (6).$$

In this case, $\epsilon$ is a constant that is larger than zero and smaller than one, and is preferably set to 0.01. By using the Equation (6), a memory utilization amount for calculating the centroid position pm(k) at the sampling timing k can be reduced. In addition, the centroid position pm(k) is not updated for a relatively long term in continuous wind and rain when the Equation (1) is used, however, the centroid position pm(k) can be updated by using the Equation (6) also when a state in which the waveform of the complex demodulation signal dam is unstably continues due to continuous wind and rain or the like.

Further, the calculating method of the feature quantity f1-*n* (n=2, 3, . . . , MA) by each constant velocity motion feature extractor 93-*n* is not limited to the above-described Equation (3). The feature quantity f1-*n* is required to change depending on when the person 101 has or has not intruded between the transmitting antenna 4-*n* and the receiving antenna 6-*n*. For example, the function for calculating the feature quantity f1-*n* is set to have a maximum value when the amplitude of the normalized complex demodulation signal dan has a constant value of equal to or larger than a predetermined value, and a phase change rate (angular velocity on the complex plane) has a constant value.

Still further, the calculating method of the feature quantity f2-*n* (n=2, 3, . . . , M−1) by each non-constant velocity motion feature extractor 94-*n* is not limited to the above-described Equation (4). The feature quantity f2-*n* is required to change depending on when the space between the transmitting antenna 4-*n* and the receiving antenna 6-*n* has been exposed or not exposed to wind and rain. For example, the function for calculating the feature quantity f2-*n* is set to have a larger value when the rotation direction of the normalized complex demodulation signal dam on the complex plane is reversed, when the angular velocity becomes larger than a predetermined value, and when the amplitude change rate becomes larger.

Still further, the calculating method of the feature quantity f3-*n* (n=2, 3, . . . , M−1) by each isolated motion feature extractor 95-*n* is not limited to the above-described Equation (5). The feature quantity f3-*n* is required to change when an intense electric field region that is spatially isolated from the other spaces exists between the transmitting antenna 4-*n* and the receiving antenna 6-*n*. For example, the function for calculating the feature quantity f3-*n* is set to have a larger value when a correlation between the normalized complex demodulation signal dan corresponding to the receiving antenna 6-*n* and the normalized complex demodulation signal corresponding to each receiving antenna located at a distance within a predetermined value from the receiving antenna 6-*n* is higher, and to have a smaller value when the correlation between the normalized complex demodulation signal dan corresponding to the receiving antenna 6-*n* and the normalized complex demodulation signal corresponding to each receiving antenna located at a distance larger than a predetermined value from the receiving antenna 6-*n* is higher. Namely, the isolated motion feature extractor 95-*n* may calculate a feature quantity that changes depending on when the intense electric field region that is spatially isolated from the other spaces does or does not exist between the transmitting antenna 4-*n* and the receiving antenna 6-*n* based on a plurality of normalized complex demodulation signals including the normalized complex demodulation signal dan.

In addition, the intruding object discrimination apparatus 1 is configured to include the M normalizers 97-1 to 97-M, the M−2 discriminators 96-2 to 96-M−1, and the M−2 multiple-dimensional feature extractors 98-2 to 98-M−1, however, the present invention is not limited to this. For example, the intruding object discrimination apparatus 1 may be configured to include one normalizer 97-2, one multiple-dimensional feature extractor 98-2 and one discriminator 96-2. In this case, a single transmitting antenna is employed in place of the transmitting array antenna 4, and a single receiving antenna is employed in place of the receiving array antenna. Then, the multiplier 32 radiates the transmission signal generated by the signal generator 31 as radio waves with the single transmitting antenna. Further, the radio waves radiated by the single transmitting antenna are received as a received signal by the single receiving antenna, and are outputted to the quadrature detector 85-2. The quadrature detector 84-2 quadrature-detects the received signal into a complex demodulation signal that has an in-phase component and a quadrature component, with the transmission signal from the signal generator 31, and outputs a resultant signal to the feature extractor 96-2 via the low-pass filter 86-2, the A/D converter 90-2 and the normalizer 97-2.

In this case, the feature extractor 96-2 calculates a first feature quantity f1-2 that changes when the person 101 has intruded between the transmitting antenna 4-2 and the receiving antenna 6-2, and a second feature quantity f2-2 that changes when the space between the transmitting antenna 4-2 and the receiving antenna 6-2 is exposed to wind and rain, and outputs the feature quantities to the discriminator 96-2. Further, the discriminator 96-2 determines whether or not the person 101 has intruded between the transmitting antenna 4-2 and the receiving antenna 6-2 by using a two-dimensional discrimination plane P2 based on the feature quantities f1-2 and f2-2 of two dimensions.

Further, the wireless transmitter circuit 3 of FIG. 1 spectrum-spreads the transmission signal generated by the signal generator 31 with the PN code, and wirelessly transmits a resultant signal with the transmitting array antenna 4 including the M transmitting antennas 4-1 to 4-M in the above-described embodiment, however, the present invention is not limited to this. The wireless transmitter circuit 3 may modulate a predetermined carrier signal with a predetermined modulation method according to the transmission signal generated by the signal generator 31, and wirelessly transmit a resultant signal with the above-described transmitting antennas 4-1 to 4-M. In this case, the wireless receiver circuit 8 wirelessly receives the transmission signals transmitted from the transmitting antennas 4-1 to 4-M with the receiving antennas 6-1 to 6-M, respectively, demodulates the signals that are wirelessly received into a plurality of complex demodulation signals with a demodulation method corresponding to the modulation method used in the wireless transmitter circuit 3, and outputs a resultant signal to the intruding object discrimination circuit 9.

INDUSTRIAL APPLICABILITY

As described above, according to the intruding object discrimination apparatus of the present invention, there are provided the normalizing means that generates the normalized complex demodulation signal by normalizing the position of the inputted complex demodulation signal on the complex plane with the complex demodulation signal in the stationary state in which no intruding object intrudes between the transmitting antenna apparatus and the receiving antenna apparatus, and the multiple-dimensional feature extraction means that calculates the multiple-dimensional feature quantity of the normalized complex demodulation signal. Therefore, it is possible to reduce the frequency of erroneous alarm and to discriminate accurately that an intruding object has intruded as compared with the prior art intruding object discrimination apparatus that uses a threshold process.

REFERENCE SIGNS LIST

1: intruding object discrimination apparatus, 2: PN code generator, 3: wireless transmitter circuit, 4: transmitting array antenna, 5: terminator, 6: receiving array antenna, 7: terminator, 8: wireless receiver circuit, 9: intruding object discrimination circuit, 10: alarm apparatus, 4-1 to 4-M: transmitting antenna, 6-1 to 6-M: receiving antenna, 31: signal generator, 32: multiplier, 82-1 to 82-M: delay device, 83-1 to 83-M: multiplier, 84-1 to 84-M: bandpass filter, 85-1 to 85-M: quadrature detector, 86-1 to 86-M: low-pass filter, 87-1 to 87-M: demodulator circuit, 90-1 to 90-M: A/D converter, 91-1 to 91-M: stationary state estimating and updating circuit, 92-1 to 92-M: normalization processing circuit, 93-2 to 93-M−1: constant velocity motion feature extractor, 94-2 to 94-M−1: non-constant velocity motion feature extractor, 95-2 to 95-M−1: isolated motion feature extractor, 96-2 to 96-M−1: discriminator, 97-1 to 97-M: normalizer, 98-2 to 98-M−1: multiple-dimensional feature extractor, 101: person, 102: rain.

The invention claimed is:

1. An intruding object discrimination apparatus comprising:

a transmitter circuit that generates a predetermined transmission signal and wirelessly transmits the transmission signal with a transmitting antenna apparatus; and a receiver circuit that wirelessly receives a transmitted transmission signal with a receiving antenna apparatus that is provided opposite to the transmitting antenna apparatus, and demodulates a signal that is wirelessly received into a complex demodulation signal by executing quadrature detection of the signal that is wirelessly received using the transmission signal, wherein the intruding object discrimination apparatus comprises:

a normalizer that generates a normalized complex demodulation signal by normalizing a position of an inputted complex demodulation signal on a complex plane with a complex demodulation signal in a stationary state in which no intruding object intrudes between the transmitting antenna apparatus and the receiving antenna apparatus;

a multiple-dimensional feature extractor that calculates a multiple-dimensional feature quantity of the normalized complex demodulation signal; and a discriminator that discriminates whether or not an intruding object is intruded between the transmitting antenna apparatus and the receiving antenna apparatus by using a predetermined discrimination plane based on a calculated multiple-dimensional feature quantity, and outputs a discrimination signal representing a discrimination result, the discrimination plane being a boundary formed of axes of the multiple-dimensional feature quantity for discriminating whether or not the intruding object is intruded between the transmitting antenna apparatus and the receiving antenna apparatus, wherein the transmitting antenna apparatus comprises a plurality of three or more transmitting antennas, wherein the receiving antenna apparatus comprises a plurality of three or more receiving antennas, wherein the transmitter circuit wirelessly transmits the transmission signal with the plurality of transmitting antennas, wherein the receiver circuit wirelessly receives transmission signals transmitted from the plurality of transmitting antennas with the plurality of receiving antennas, respectively, and demodulates signals that are wirelessly received into a plurality of complex demodulation signals, wherein the intruding object discrimination apparatus comprises:

a plurality of the normalizers to which the plurality of complex demodulation signals are inputted, respectively;

a plurality of the multiple-dimensional feature extractors to which a plurality of normalized complex demodulation signals are inputted from a plurality of predetermined normalizers selected from among the plurality of normalizers; and a plurality of the discriminators to which multiple-dimensional feature quantities are inputted from the plurality of the multiple-dimensional feature extractors, respectively, wherein each of the multiple-dimensional feature extractor comprises:

a first feature extractor that calculates, based on one predetermined normalized complex demodulation signal selected from among a plurality of inputted normalized complex demodulation signals, a first feature quantity that changes when an intruding object is intruded between a transmitting antenna and a receiving antenna corresponding to the one predetermined normalized complex demodulation signal;

a second feature extractor that calculates, based on the one predetermined normalized complex demodulation signal, a second feature quantity that changes when a space between the transmitting antenna and the receiving antenna corresponding to the one predetermined normalized complex demodulation signal is exposed to wind and rain; and a third feature extractor that calculates, based on a plurality of inputted normalized complex demodulation signals, a third feature quantity that changes when an intense electric field region that is spatially isolated from other spaces exists in the neighborhood of an intruding object between the transmitting antenna and the receiving antenna corresponding to the one predetermined normalized complex demodulation signal among spaces between the plurality of transmitting antennas and the plurality of receiving antennas, and wherein each of the discriminators discriminates whether or not the intruding object is intruded between the transmitting antenna and the receiving antenna corresponding to the one predetermined normalized complex demodulation signal, based on calculated first to third feature quantities.

2. The intruding object discrimination apparatus as claimed in claim 1, wherein the transmitter circuit wirelessly transmits the transmission signal with the plurality of transmitting antennas after spectrum-spreading the transmission signal with a pseudo noise code, and wherein the receiver circuit generates a plurality of delayed pseudo noise codes by delaying the pseudo noise code by a plurality of delay times different from each other, respectively, generates a plurality of de-spread received signals by de-spreading signals that are wirelessly received with the plurality of delayed pseudo noise codes, and demodulates the de-spread received signals into the plurality of complex demodulation signals, respectively, by executing quadrature detection of the de-spread received signals using the transmission signal.

3. The intruding object discrimination apparatus as claimed in claim 1, wherein the transmitting antenna apparatus is a first leaky coaxial cable, and wherein the receiving antenna apparatus is a second leaky coaxial cable.

4. The intruding object discrimination apparatus as claimed in claim 2, wherein the transmitting antenna apparatus is a first leaky coaxial cable, and wherein the receiving antenna apparatus is a second leaky coaxial cable.

* * * * *